United States Patent Office 2,830,784
Patented Apr. 15, 1958

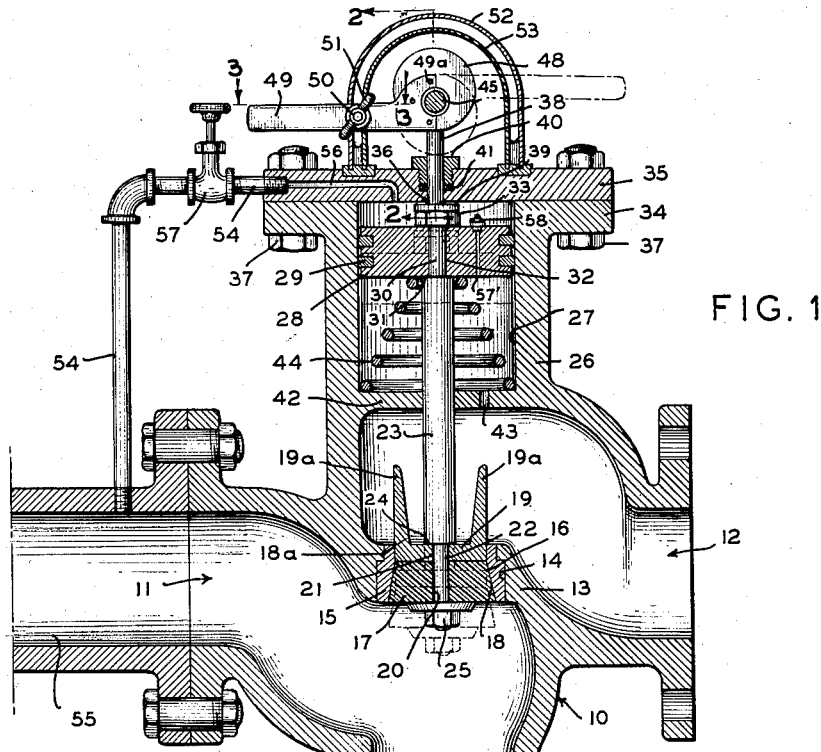
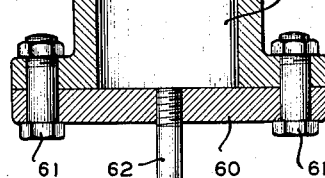
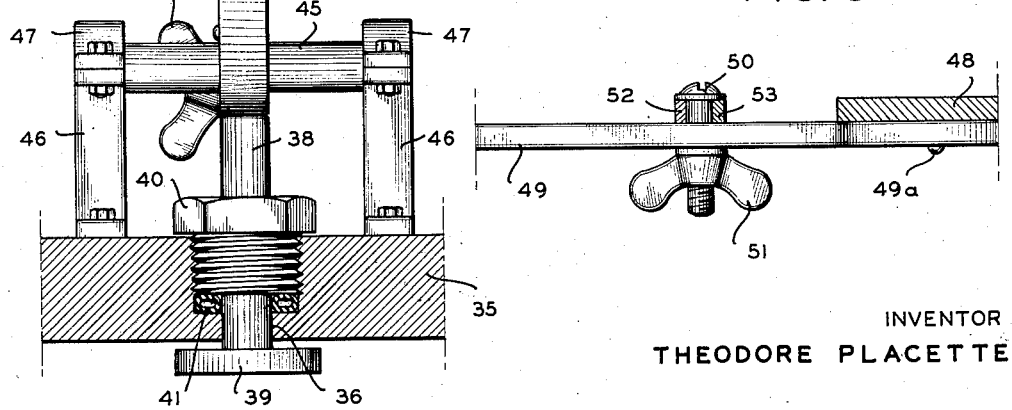

2,830,784

GENERAL PURPOSE FLOW VALVE WITH ALTERNATIVE FLUID PRESSURE OR MANUAL CONTROL

Theodore Placette, San Marcos, Tex.

Application September 30, 1954, Serial No. 459,249

1 Claim. (Cl. 251—14)

This invention relates to the distribution of fluid and more particularly to a general purpose flow valve for controlling the passage of fluid.

More particularly the present invention relates to a general purpose flow valve in which the pressure of the fluid is employed for maintaining the valve tightly closed and for selectively opening the valve and thereafter maintaining the same in such open position and as well as a valve of such character which may be opened manually and held open in a fixed position.

Valves of numerous kinds have been produced, some of which have been found unsatisfactory for various reasons including the fact that they were too complicated and expensive, they lacked durability, they leaked, they required too much power to operate, and were subject to criticism for other reasons.

It is an object of the invention to provide a valve in which the above defects are overcome, which is relatively simple to construct, apply, operate, and maintain and which requires only a small fraction of the power ordinarily required by the valves now in use to open and close.

Another object of the invention is to provide a valve body which is tapered and which will be maintained tightly against its seat by the pressure of the fluid on the valve due to its opening against the direction of the flow, as well as a valve having means for opening the same and for manually sealing it in open position.

Another object of the invention is to provide a valve in which entrapped fluid may escape slowly and thereby cushion the valve to prevent slamming during closing, said valve having a seat of synthetic rubber or the like and with guide means for preventing chattering.

A still further object of the invention is to provide a valve having a pressure control which includes a piston and a rod for operating the same, with manual means also being provided for actuating said valve.

Other objects and advantages of the invention will be apparent from the following description taken in conjunction with the accompanying drawing wherein:

Fig. 1 is a vertical section illustrating one application of the invention;

Fig. 2, a section on the line 2—2 of Fig. 1; and

Fig. 3, a section on the line 3—3 of Fig. 1.

Briefly stated, the valve of the present invention is a general purpose flow valve and includes a valve body having an inlet and an outlet with an inverted valve seat and an inverted valve for engagement with said seat for shutting off the flow through the valve body. To the valve body is connected a valve stem which extends into a valve chamber and is connected to a control piston normally urged toward a position to close the valve by means of a spring. The valve stem is provided with a reduced portion forming a shoulder against which the piston engages, being retained in position by means of a nut. A removable closure is provided for the outer end of the chamber in which the piston is located and through such closure extends a plunger, the end of which abuts the end of the valve stem and by means of which when pushed downwardly the valve may be unseated.

Where the plunger extends through the closure it is sealed by means of a well known O-ring seal retained by a lock nut in a suitable rceess about such plunger. In order to move the plunger downwardly to unseat the valve a shaft is mounted across the end of this plunger and an eccentric or cam is mounted on said shaft so that when rotated it engages the end of the plunger to unseat the valve. A handle is provided for rotating the shaft on which the eccentric or cam is mounted and a wing nut is provided for fastening the handle in a definite position thus permitting the valve to be opened to any desired degree.

In order that the valve may be opened and maintained open, or in other words be controlled by the pressure of the fluid admitted to the valve, a line is provided in communication with the fluid in the pipe leading to the valve and this line extends into the upper end of the cylinder and is controlled by a manual valve. The piston is of larger diameter than the valve body and consequently fluid admitted through the control line into the cylinder above the upper end of the piston will exert pressure in a manner to cause the valve to open against the pressure of the fluid in the main line since the valve in the main line is of a smaller diameter and consequently has a smaller surface area than the top of the control piston.

Thus a valve is provided for controlling flow of fluid which valve can be set in open position to permit flow therethrough at all times or it can be set to be opened by the pressure of the fluid admitted to the valve which control is selective as is also the adjustment of the valve when it is in open position. The piston is provided with a restricted flow arrangement which may include a check valve so that flow therethrough will be gradual and the main valve will close gently and not slam shut.

With continued reference to the drawing, the valve of the present invention comprises a valve housing for body 10 having an inlet 11 and an outlet 12. The valve housing or body is provided with a substantially horizontal wall 13 and a dual diameter passage 14 in which is disposed a correspondingly shaped inverted valve seat 15 which has a pressed fit in the opening. The valve seat is provided with a tapered surface 16 adapted to be engaged by an inverted valve body 17 having a tapered surface 18 complementary to the taper of the seat so that when the parts are engaged a tight fit will be had. The body of the valve may be of synthetic material commonly used for such purposes.

The valve seat has a cylindrical portion 18a which receives a valve guide in the form of a transverse disc 19 provided with upwardly directed and axially disposed guide portions or fingers 19a, the outer surfaces of which are adapted to engage the cylindrical portion of the valve seat with a sufficiently small clearance that chattering will be prevented.

The valve body and valve guide have aligned central openings 20 and 21 respectively, in which is received the reduced end 22 of a valve stem 23. A shoulder 24 is provided between the valve stem and said reduced extremity, the upper surface of the valve guide 19 engaging said shoulder and the free extremity of the reduced portion of the valve stem being externally threaded for engagement with a lock nut or the like 25 whereby the parts are maintained in assembled relationship.

The valve housing is provided with an upwardly extending portion or cylinder wall 26 having a control chamber or cylinder 27 therein in which is located a piston 28 provided with sealing rings 29 which engage the inner surface of the cylinder 27. The upper extremity of the valve stem 23 comprises a reduced portion 30 forming a shoulder 31 and the piston is provided with an opening 32 in which the reduced portion 30 of this stem is received, the piston 28 abutting the shoulder 31. A lock nut 33 is threaded on the free extremity of reduced portion 30 of the valve stem and maintains the control piston in fixed relation.

The cylinder wall 26 is provided with an upper flange 34 and a removable cylinder head 35, having a centrally located opening 36 disposed in vertical alignment with the upper extremity 30 of the valve stem 23, such head being secured to said flange by means of bolts 37. A plunger 38 is mounted within the opening 36 for vertical movement, the lower extremity of said plunger comprising a disc or head 39 located close to the upper surface of the lock nut 33 and adapted to be moved against such nut to move the valve stem 23 axially to open the valve.

To provide a fluid tight joint about the plunger 38, an O-ring seal is disposed against a shoulder within the opening 36 and serves to give a tight seal with minimum friction, thereby eliminating the old style stuffing box. The seal 41 is retained by a nut 40.

The cylinder 27 includes a bottom wall 42, provided with a relatively small aperture 43 for the escape of fluid from beneath the piston 28. A coil spring or the like 44 is disposed within the cylinder between the wall 42 and the piston 28, in surrounding relationship with respect to the valve stem 23. The spring normally urges the piston 28 upwardly, closing the valve 17 and, through contact of the lock nut 33 with the head 39 causes the plunger 38 to travel to its upper limit.

Across the upper end of the plunger 38 is mounted a cam shaft 45 on spaced standards 46 having pivot or bearing blocks 47 in which are received the ends of the shaft 45. Fixed to the shaft 45 is an eccentric or cam 48 so that when the shaft is rotated the eccentric will engage the plunger 38 and depress the same in one position or allow it to be disposed at the upper limit of its movement when the eccentric is in the opposite position. A control lever or operating handle 49 is secured by means of fastening elements 49a to the eccentric. The lever is provided with a bolt 50 and wing nut 51, by means of which the handle or lever 49 may be secured in any desired position, the lever travelling through an arc of approximately 180°. A pair of parallel U-shaped members 52 and 53 receive the bolt 50 therebetween with the head of the bolt being disposed on the opposite side of said members from the handle so that when the wing nut is tightened as shown in Fig. 3, the members 52 and 53 will be bound together in fixed relation.

The purpose of the piston 28 is to operate the valve stem axially to unseat the valve body 17. The reciprocation of this valve stem and valve body may be done by manual operation of the lever 49 swinging it from one position to another or it may be operated by fluid pressure and in order to accomplish this a pipe 54 is conected to the inlet pipe 55 secured to the inlet 11 of the valve 10, the opposite extremity of the pipe 54 being connected to the cylinder head 35, a conduit 56 within said cylinder head providing communication between the pipe 54 and the cylinder 27 above the piston 28. A manual valve 57 may be employed for controlling the flow through the line 54.

Normally pressure is exerted against the underside of valve 17 and when the valve 57 is open fluid will flow through lines 54 and 55 and channel 56 directly into the upper end of the cylinder 27. This fluid will react against the upper surface of the piston 28 in opposition to fluid pressure against the other side of the valve body and since the area upon the upper surface of the piston is greater than that of the bottom of the valve there will be a presure differential which will force the valve downwardly against the pressure of the spring 44 which tends to maintain the piston in its uppermost position. The piston 28 is provided with a small fluid passage 57' therethrough having a check valve 58 therein. Through this passage fluid entrapped above the piston may be expelled and at the same time cushion the closing of the main valve 17. If it is desired to maintain the valve in open position, the handle 49 can be swung to move the eccentric 48 into contact with the upper end of the plunger 38 in which position it can be locked by tightening the wing nut 51 during which time the valve 57 remains closed.

When the main valve is open and it is desired to close the same the wing nut 51 is loosened and the lever 49 is swung to move the cam 48 away from the end of the plunger 38. Then making sure that valve 57 is closed the spring 44 will then move the piston, piston valve stem and valve assembly upward to its closed position. Fluid trapped in the cylinder above the piston will continuously pass through the small port 57' in the piston and the check valve into the low pressure side of the chamber which is in communication with the discharge side of the valve through aperture 43 and on account of the restricted flow through the flow limiting arrangement including check valve 58 and restricted passage 57, the main valve will close gently and will not slam shut, this being an important feature of the valve design. The check valve 58 prevents reverse flow of fluid from outlet 12 to inlet 11 in the event of low pressure in inlet 11. Due to the close tolerances betwen the valve guide and the cylindrical portion of the valve seat smooth operation will result without chattering. Further, by reason of the fact that the valve body 17 is of synthetic material, a tight seal will be insured, and the high presure against the bottom of the valve will cause it to close tightly and without leakage.

Desirably, the valve housing may be provided with a suitable trap 59 closed by an end plate 60 maintained in position by bolts or the like 61. Additionally, the plate 60 may be provided with a suitable drain 62.

When there is no pressure on either side of the main valve 17 it can be opened by moving the control lever 49 from closed to open position to force the plunger endwise against the nut 33 on the reduced threaded end of the valve stem during which operation leakage through the head 35 is prevented by means of the O-ring seal. During the opening of the valve, fluid in the cylinder 27 beneath the piston 28 will escape through the outlet 43 in the wall of the valve housing into the low pressure side or chamber on the discharge side of the main valve. During the closing of the valve, fluid will be expelled through the port 57' and check valve 58 into the lower portion of the cylinder. On account of the restricted area of this passage and the check valve the main valve will close gently and not slam shut.

From the above it will be apparent that the valve of the present invention is subject to a control in accordance with the pressure within the valve so that the valve will open when the pressure is adequate due to the difference in the surface areas against which the pressure is applied. Also it is simple in construction, operation, and maintenance; and if it is desired to disassemble the valve for inspection, repair, or other reason, this can be done without removing the valve from the line by merely removing the head 35 and the cover 60 in a minimum of time so that a complete reconditioning job can be completed in a very short time regardless of the size of the valve and unlike other valves which require removal from the line and such operation consuming many hours.

It will be obvious to those skilled in the art that various changes may be made in the invention without departing from the spirit and scope thereof and therefore the invention is not limited by that which is illustrated in the drawing and described in the specification but only as indicated in the appended claim.

What is claimed is:

A general purpose flow valve comprising a housing having an inlet and an outlet with a transverse wall extending across said housing and separating said inlet from said outlet, said housing being provided with a cylindrical portion having a cylindrical bore extending outwardly from the outlet side of said housing, a valve seat in said transverse wall in axial alignment with said bore, a valve stem, a valve head mounted on one end of said stem for movement in one direction into said inlet and in the other direction against said seat for providing communication between said inlet and the outlet and for preventing communication respectively, a piston slidably mounted in said cylindrical bore and fixedly mounted on said valve stem, a cylinder head closing said cylindrical bore, a plunger extending through said cylinder head and slidably and sealingly mounted therein for axial movement relative to said valve rod and piston to open said valve or to permit said valve to be closed, spring means to bias said valve into closed position, a cam rotatively mounted exteriorly on said cylinder head for engagement with said plunger to move said plunger and said valve against the bias of said spring, a control lever fixed to said cam for rotating said cam, an arcuate member fixed on said cylinder head adjacent the path of movement of said handle, adjustable connecting means between said handle and said arcuate member to maintain said handle and valve in an adjusted position, means to supply fluid pressure between said cylinder head and said piston for causing said piston to move said valve rod thereby opening said valve, said supply means including a conduit providing flow communication from said inlet of said valve to the space between said piston and said cylinder head, and including a pilot valve for controlling the flow through said conduit, and constricted bleeder means through said piston communicating with said outlet to permit the passage of fluid from between said piston and said cylinder head to permit said piston with said valve rod and valve to move toward said cylinder head.

References Cited in the file of this patent

UNITED STATES PATENTS

| | | |
|---|---|---|
| 620,287 | Donnelly | Feb. 28, 1899 |
| 624,890 | Batchelor | May 9, 1899 |
| 1,005,117 | Judell | Oct. 3, 1911 |
| 2,035,747 | Harris | Mar. 31, 1936 |
| 2,333,100 | Grant | Nov. 2, 1943 |
| 2,368,212 | Grant | Jan. 30, 1945 |
| 2,587,212 | Placette | Feb. 26, 1952 |